(12) United States Patent
Ricketts et al.

(10) Patent No.: US 11,083,136 B2
(45) Date of Patent: Aug. 10, 2021

(54) TAPERED VANE FOR AGRICULTURAL HARVESTER TRANSITION CONE

(71) Applicant: CNH Industrial America LLC, New Holland, PA (US)

(72) Inventors: Jonathan E. Ricketts, Coal Valley, IL (US); Wayne T. Flickinger, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 314 days.

(21) Appl. No.: 16/182,963

(22) Filed: Nov. 7, 2018

(65) Prior Publication Data

US 2019/0069489 A1 Mar. 7, 2019

Related U.S. Application Data

(63) Continuation of application No. 15/294,246, filed on Oct. 14, 2016, now Pat. No. 10,123,485.

(60) Provisional application No. 62/242,538, filed on Oct. 16, 2015.

(51) Int. Cl.
*A01F 12/10* (2006.01)
*A01F 12/20* (2006.01)
*A01F 7/06* (2006.01)

(52) U.S. Cl.
CPC .............. *A01F 12/20* (2013.01); *A01F 7/062* (2013.01); *A01F 7/065* (2013.01); *A01F 7/067* (2013.01); *A01F 12/10* (2013.01)

(58) Field of Classification Search
CPC .......... A01F 12/10; A01F 12/20; A01F 12/26; A01F 7/062; A01F 7/067; A01F 7/065; A01F 7/06
See application file for complete search history.

(56) References Cited

U.S. PATENT DOCUMENTS

| 2,298,445 | A |   | 10/1942 | Welty |   |
|---|---|---|---|---|---|
| 3,034,513 | A |   | 5/1962 | Ausherman |   |
| 3,203,428 | A |   | 8/1965 | Ausherman |   |
| 3,827,443 | A | * | 8/1974 | Drayer | A01F 7/06 460/16 |
| 3,828,793 | A | * | 8/1974 | Gochanour | A01F 7/06 460/70 |
| 3,982,549 | A | * | 9/1976 | De Pauw | A01F 7/06 460/67 |

(Continued)

FOREIGN PATENT DOCUMENTS

GB 355748 A 8/1931

*Primary Examiner* — Adam J Behrens
(74) *Attorney, Agent, or Firm* — Patrick Sheldrake; Peter Zacharias (57) ABSTRACT

A transition cone for a threshing system of an agricultural harvesting machine has an inner surface with a tapering inner circumference between a wider upstream end and a narrower downstream end, and a plurality of vanes in the transition cone. Each vane extends between the upstream end and the downstream end and at least partly around the tapering inner circumference. Each vane includes an upstanding segment extending away from the inner surface, and a base segment extending from the upstanding segment along the inner surface on the downstream side of the upstanding segment. The base segment has a thicker proximal region adjacent the upstanding segment and a thinner distal edge opposite thereto.

15 Claims, 6 Drawing Sheets

(56) References Cited

U.S. PATENT DOCUMENTS

| | | | | |
|---|---|---|---|---|
| 4,148,323 A * | 4/1979 | McMillen | A01F 7/06 | 460/70 |
| 4,177,821 A | 12/1979 | Peiler et al. | | |
| 4,248,248 A | 2/1981 | De Busscher et al. | | |
| 4,291,709 A * | 9/1981 | Weber | A01F 7/06 | 460/70 |
| 4,541,441 A * | 9/1985 | Ichikawa | A01F 12/442 | 460/66 |
| 4,900,290 A * | 2/1990 | Tanis | A01F 12/10 | 209/263 |
| 4,986,794 A * | 1/1991 | Ricketts | A01F 7/06 | 460/67 |
| 5,078,646 A * | 1/1992 | Claas | A01F 7/06 | 460/69 |
| 5,145,462 A * | 9/1992 | Tanis | A01F 12/10 | 460/68 |
| 5,257,959 A * | 11/1993 | Tanis | A01F 12/10 | 460/67 |
| 5,387,153 A * | 2/1995 | Tanis | A01F 7/06 | 460/68 |
| 6,050,894 A * | 4/2000 | Johnson | A01F 7/06 | 460/68 |
| 6,129,629 A * | 10/2000 | Dammann | A01F 7/06 | 460/67 |
| 6,296,566 B1 * | 10/2001 | Tanis | A01F 12/10 | 460/68 |
| 6,517,431 B2 * | 2/2003 | Schwersmann | A01F 7/06 | 460/16 |
| 6,544,118 B2 * | 4/2003 | Schwersmann | A01F 7/06 | 460/16 |
| 6,830,512 B2 * | 12/2004 | Tanis | A01F 7/06 | 460/46 |
| 7,462,101 B2 * | 12/2008 | Grywacheski | A01F 7/06 | 460/119 |
| 7,717,777 B2 * | 5/2010 | Pope | A01F 7/067 | 460/69 |
| 8,221,202 B2 * | 7/2012 | Pope | A01F 7/06 | 460/68 |
| 8,540,559 B1 * | 9/2013 | Flickinger | A01F 7/067 | 460/69 |
| 9,119,349 B2 * | 9/2015 | Ricketts | A01F 12/26 | |
| 9,807,937 B2 * | 11/2017 | Flickinger | A01F 12/24 | |
| 2002/0045469 A1 * | 4/2002 | Schwersmann | A01F 7/06 | 460/70 |
| 2014/0174049 A1 * | 6/2014 | Ricketts | A01F 12/26 | 56/14.6 |

\* cited by examiner

TAPERED VANE FOR AGRICULTURAL HARVESTER TRANSITION CONE

CROSS REFERENCE TO RELATED APPLICATIONS

This is a continuation of U.S. patent application Ser. No. 15/294,246 entitled "TAPERED VANE FOR AGRICULTURAL HARVESTER TRANSITION CONE," filed Oct. 14, 2016, which is incorporated herein by reference. U.S. patent application Ser. No. 15/294,246 is a non-provisional application based upon U.S. provisional patent application Ser. No. 62/242,538 entitled "TAPERED VANE FOR AGRICULTURAL HARVESTER TRANSITION CONE," filed Oct. 16, 2015, which is incorporated herein by reference.

BACKGROUND OF THE INVENTION

1. Field of the Invention

The present invention relates generally to agricultural harvesters such as combines, and more particularly to feeder housing transition cones of threshing or separating systems in such combines, and still more particularly to vanes on the inner surfaces of the transition cones.

2. Description of the Related Art

An agricultural harvester known as a "combine" is historically termed such because it combines multiple harvesting functions, such as picking or cutting, threshing, separating and cleaning in a single harvesting machine. A typical combine includes a header which removes the crop from a field, and a feeder housing which transports the crop matter into a threshing rotor. The threshing rotor rotates within a perforated housing, which may be in the form of adjustable concaves, and performs a threshing operation on the crop, to dislodge the grain from other crop material. Once the grain is threshed, it falls through perforations in the concaves onto a grain pan. From the grain pan, the grain is cleaned on sieves in a cleaning system. A cleaning fan blows air through the sieves to discharge chaff and other debris toward the rear of the combine. Non-grain crop material, such as straw from the threshing system, proceeds through a residue system, which may utilize a straw chopper to process the non-grain material and direct it out the rear of the combine. The cleaned grain is transported to a grain tank onboard the combine. When the grain tank becomes full, the combine is positioned adjacent a vehicle into which the grain is to be unloaded, such as a semi-trailer, gravity box, straight truck, or the like; and an unloading system on the combine is actuated to transfer the grain from the grain tank into the vehicle.

More particularly, a rotary threshing or separating system includes one or more rotors which can extend axially (front to rear) or transversely (side to side) within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to the cleaning system. Alternatively, the grain and finer non-grain crop material may also fall directly onto the cleaning system itself.

The cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve is discharged at the rear of the combine. Grain falling through the lower sieve lands on a bottom pan of the cleaning system, where it is conveyed forwardly toward a clean grain auger. The clean grain auger conveys the grain to the onboard grain tank for temporary storage.

In combines having a rotor operating within a concave formed as a rotor cage, it is known to provide a transition cone between the feeder housing and the rotor cage. The transition cone narrows along its length, from the upstream end to the downstream end of the cone. An auger flight operated by the rotor transports the cut crop material through the transition cone, from the feeder housing to the rotor cage. It is known to provide helical vanes on the inside surface of the transition cone, to facilitate efficient transport of crop material through the transition cone. Known transition cone vanes are made from angle-iron or other L-shaped material that is additionally shaped to conform to the inner surface of the transition cone, along a generally helical or spiral path. Accordingly, each has relatively thin upstanding and base segments of consistent thickness throughout. A plurality of vanes may be used in each transition cone. The transition cone vanes operate to direct and orient the crop material transported there along by the rotating auger flight. The L-shaped material is forwardly facing in the machine; that is, the base portion extends upstream from the upstanding portion. The vanes have been attached using threaded fasteners inserted from the inside, through the base of the cone vane and the transition cone itself. Bolts having elongated heads have been used so that the elongated head will engage the upstanding segment of the cone vane to prevent rotation of the bolt as a nut is fastened on the end of the bolt at the outside of the transition cone. Limited space in the transition cone makes the use of wrenches difficult, so the aforedescribed T-bolts have been used. However, removing and replacing vanes in the transition cone has been difficult and time-consuming because of the limited access available, and the somewhat cumbersome nature of inserting T-bolts from the inside.

During use, the crop material tends to follow along the transition cone vane and is somewhat compressed against the inside surface of the narrowing cone. Experience has shown that the greatest regions of wear occur on the inner surface of the transition cone immediately downstream from the upstanding portions of the transition cone vanes. To reduce the effects of wear, manufacturers have used hardened coatings and/or material treatments on the inside surface of the transition cone, which can add significant cost.

What is needed in the art is a vane for the transition cone in an agricultural harvester that improves the movement of crop material there along, minimizes wear and facilitates removal and installation of the vane.

SUMMARY OF THE INVENTION

The present invention provides a vane having a base segment extending in the downstream direction from an upstanding segment of the vane and having a curved base segment surface tapering to the downstream edge. The base can form the female components of the threaded fasteners used to attach the vane to the transition cone, or can capture a female component for a threaded fastener, allowing the fasteners to be inserted from the outside of the transition cone.

The invention in one form is directed to an agricultural harvester with a chassis; a threshing system carried by the chassis and including a rotor and a rotor cage having a concave; and a transition cone defining an infeed to the rotor cage and rotor. The transition cone has an inner surface with a tapering circumference between an upstream end and a downstream end. A vane in the transition cone extends between the upstream end and the downstream end and along at least a portion of the cone inner surface circumference. The vane includes an upstanding segment extending away from the inner surface, with an upstream side of the upstanding segment facing the upstream end, and a downstream side of the upstanding segment facing the downstream end. A base segment of the vane extends from the upstanding segment along the inner surface on the downstream side of the upstanding segment. The base segment has a thicker proximal region adjacent the upstanding segment and a thinner distal edge opposite thereto.

The invention, in another form, is directed to a threshing system of an agricultural harvester provided with a rotor cage, a transition cone defining an infeed to the rotor cage, the transition cone having an inner surface with a tapering inner circumference between a wider upstream end and a narrower downstream end, and a vane in the transition cone extending between the upstream end and the downstream end and at least partly around the tapering inner circumference. The vane includes an upstanding segment extending away from the inner surface, with an upstream side of the upstanding segment facing the upstream end, and a downstream side of the upstanding segment facing the downstream end; and a base segment extending from the upstanding segment along the inner surface on the downstream side of the upstanding segment. The base segment has a thicker proximal region adjacent the upstanding segment and a thinner distal edge opposite thereto.

The invention, in yet another form, is directed to a threshing system of an agricultural harvester provided with a rotor cage; a transition cone defining an infeed to the rotor cage, the transition cone having an inner surface with a tapering inner circumference between a wider upstream end and a narrower downstream end; and a plurality of vanes in the transition cone. Each vane of the plurality of vanes extends between the upstream end and the downstream end and at least partly around the tapering inner circumference. Each vane includes an upstanding segment extending away from the inner surface, with an upstream side of the upstanding segment facing the upstream end, and a downstream side of the upstanding segment facing the downstream end; and a base segment extending from the upstanding segment along the inner surface on the downstream side of the upstanding segment. The base segment has a thicker proximal region adjacent the upstanding segment and a thinner distal edge opposite thereto.

The present invention, in a form thereof, advantageously provides a vane for an agricultural harvester transition cone that can be installed more quickly and more easily than existing vanes.

Another advantage of a form of the vane disclosed herein is that the vane for the transition cone conducts material there along more efficiently.

Yet another advantage of a form of the vane disclosed herein is that the replaceable vanes in an agricultural harvester transition cone protect the cone surface against wear.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
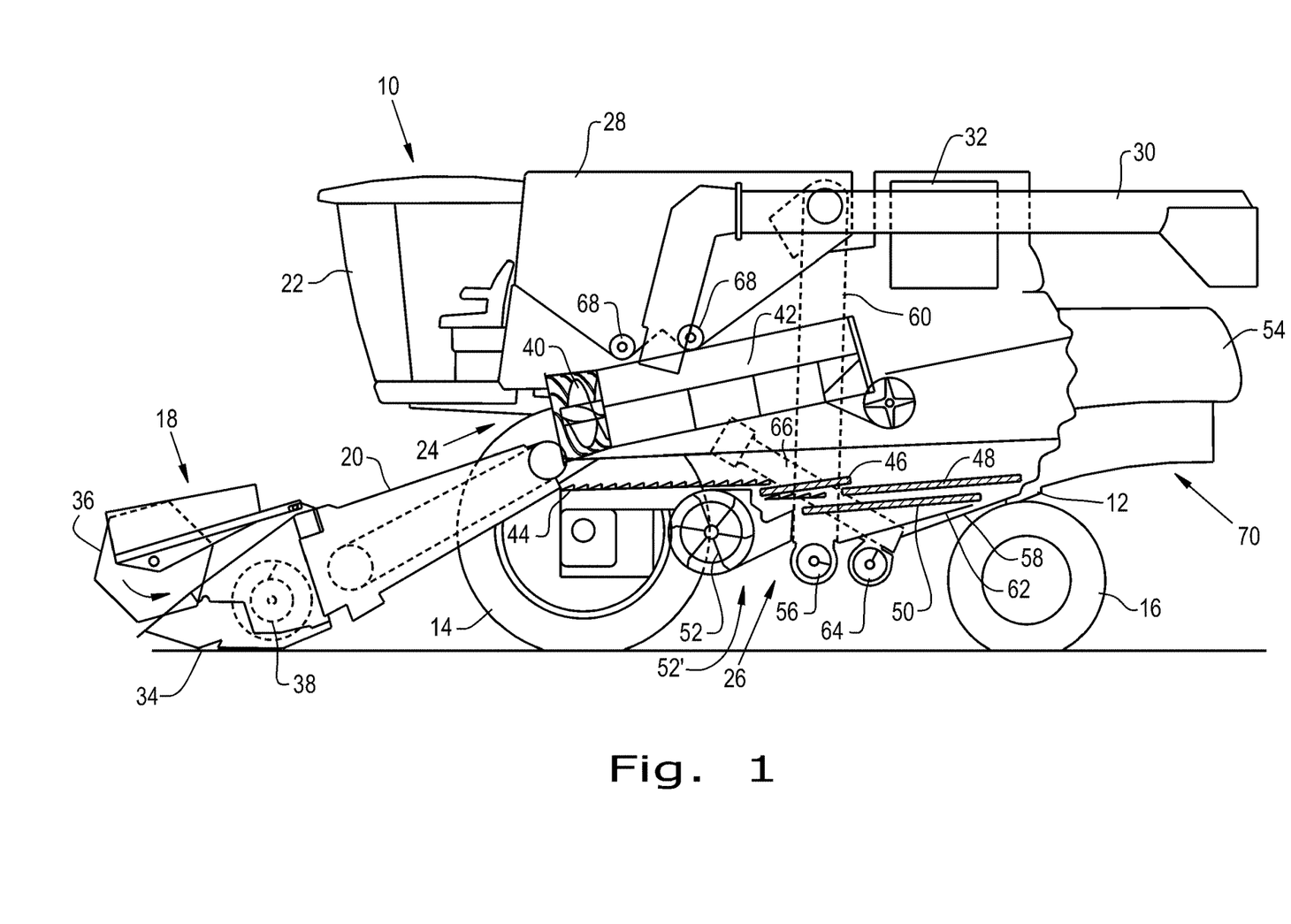
FIG. 1 is a side view of an embodiment of an agricultural harvester in the form of a combine, which includes a transition cone having vanes of the present invention.

Referring now to the drawings, and more particularly to FIG. 1, there is shown an agricultural harvester in the form of a combine 10, which generally includes a chassis 12, ground engaging front wheels 14 and rear wheels 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, it is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 generally includes a rotor 40 at least partially enclosed by and rotatable within a corresponding perforated rotor cage 42. The cut crops are threshed and separated by the rotation of rotor 40 within rotor cage 42, and larger elements, such as stalks, leaves and the like are discharged from the rear of combine 10. Smaller elements of crop material including grain and non-grain crop material, including particles lighter than grain, such as chaff, dust and straw, are discharged through perforations of rotor cage 42. Rotor 40 is shown in a representative sense in that rotor 40 may be more than one rotor 40 and may be oriented generally in line with the direction of travel of combine 10. So also, rotor cage 42 can be more than one rotor cage 42, or more than one rotor cage section commonly referred to as concaves.

Grain that has been separated by threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48, and 50 is subjected to a cleaning action by fan 52, which provides airflow through the sieves to remove chaff and other lightweight impurities, such as dust, from the grain by making the lightweight material airborne for discharge from a straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in fore-to-aft manner to spread the grain across sieves 48, 50, while permitting the passage of cleaned grain by gravity through the openings of sieves 48, 50.

Clean grain falls to a clean grain auger 56 positioned crosswise below and at the front of lower sieve 50. Clean grain auger 56 receives clean grain from each sieve 48, 50 and from a bottom pan 62 of cleaning system 26. Clean grain auger 56 conveys the clean grain laterally to a generally vertically arranged grain elevator 60 for transport to the grain tank 28. Tailings from cleaning system 26 fall to a tailings auger trough 58, and are transported via a tailings auger 64 and a return auger 66 to the upstream end of the cleaning system 26 for repeated cleaning action. A pair of grain tank augers 68 at the bottom of the grain tank 28 conveys the clean grain laterally within the grain tank 28 to the unloading auger 30 for discharge from combine 10.

The non-grain crop material proceeds through a residue handling system 70 leading to discharge from straw hood 54. The residue handling system can include a chopper, counter knives, a windrow door and a residue spreader, not shown but well understood and familiar to those skilled in the art.

Figure 2:
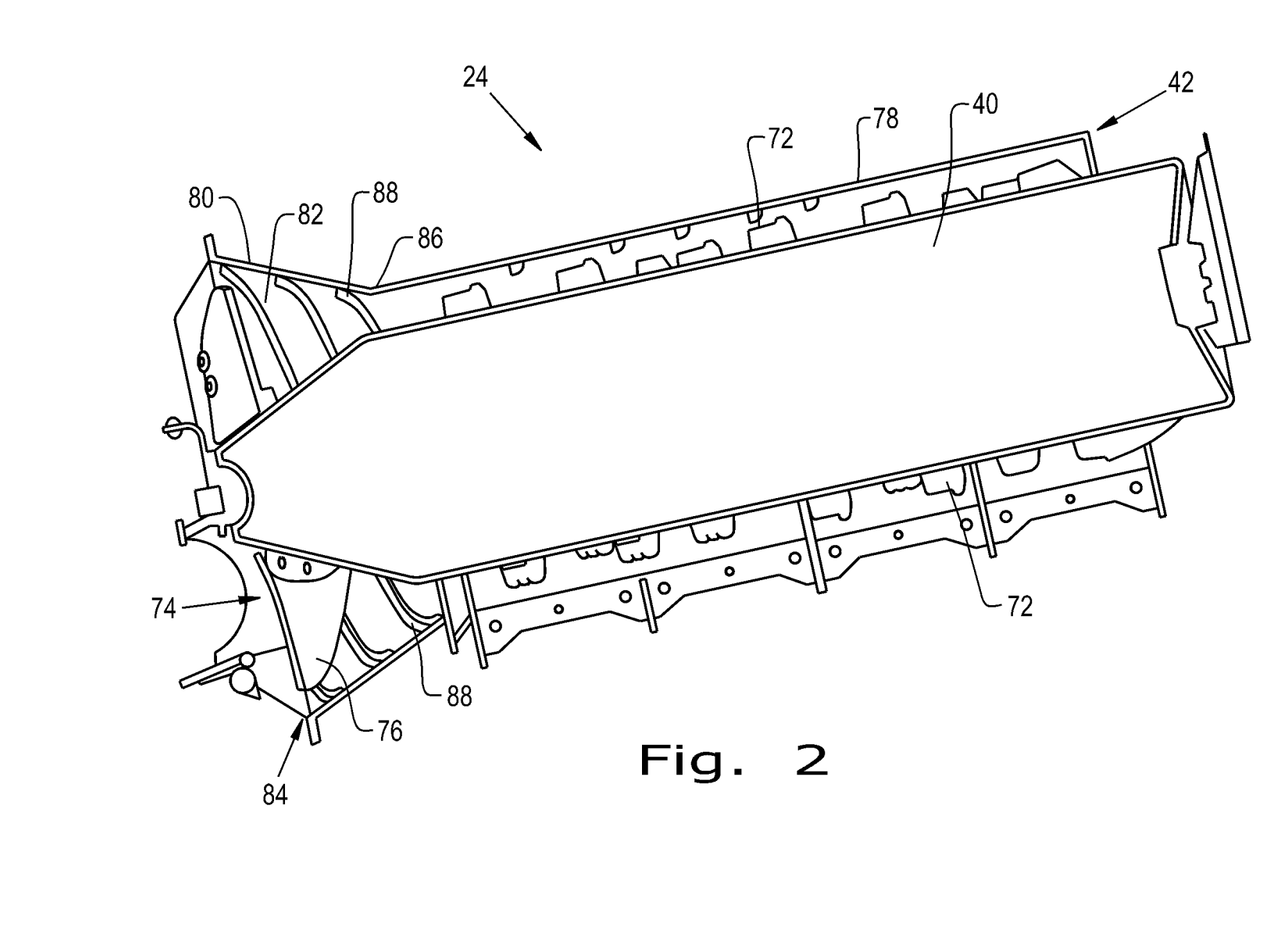
FIG. 2 is a cross-sectional view of the threshing and separating system in the harvester shown in FIG. 1, and including the transition cone having vanes of the present invention.

Now, additionally referring to FIG. 2, further detail of threshing and separating system 24 is shown. Rotor 40 includes a downstream portion having threshing elements 72, and an upstream portion defining an inlet auger 74 having an auger flight or flights 76. Rotor cage 42 includes a concave or concaves 78 operating together with threshing elements 72 of rotor 40 to separate grain from crop material. A transition cone 80 is connected to rotor cage 42 and defines an infeed to the threshing zone of rotor 40 and rotor cage 42. Transition cone 80 has a hollow conical shape including an inner cone surface 82 having a larger diameter at the upstream end 84 thereof and tapering to a smaller diameter at the downstream end 86 thereof, thereby defining a decreasing inner circumference about the inner surface from upstream end 84 to downstream end 86. At least one and typically a plurality of helical or spiral vanes 88 is provided on the inner surface of transition cone 80. Inlet auger 74 operates within transition cone 80, and crop material is transferred through transition cone 80 under the force applied by rotating auger flight 76, the directional guidance provided by vanes 88 and the influence supplied by the tapering conical shape of transition cone 80. The crop material is thereby distributed and arranged for more effective threshing in rotor cage 42.

Figure 3:
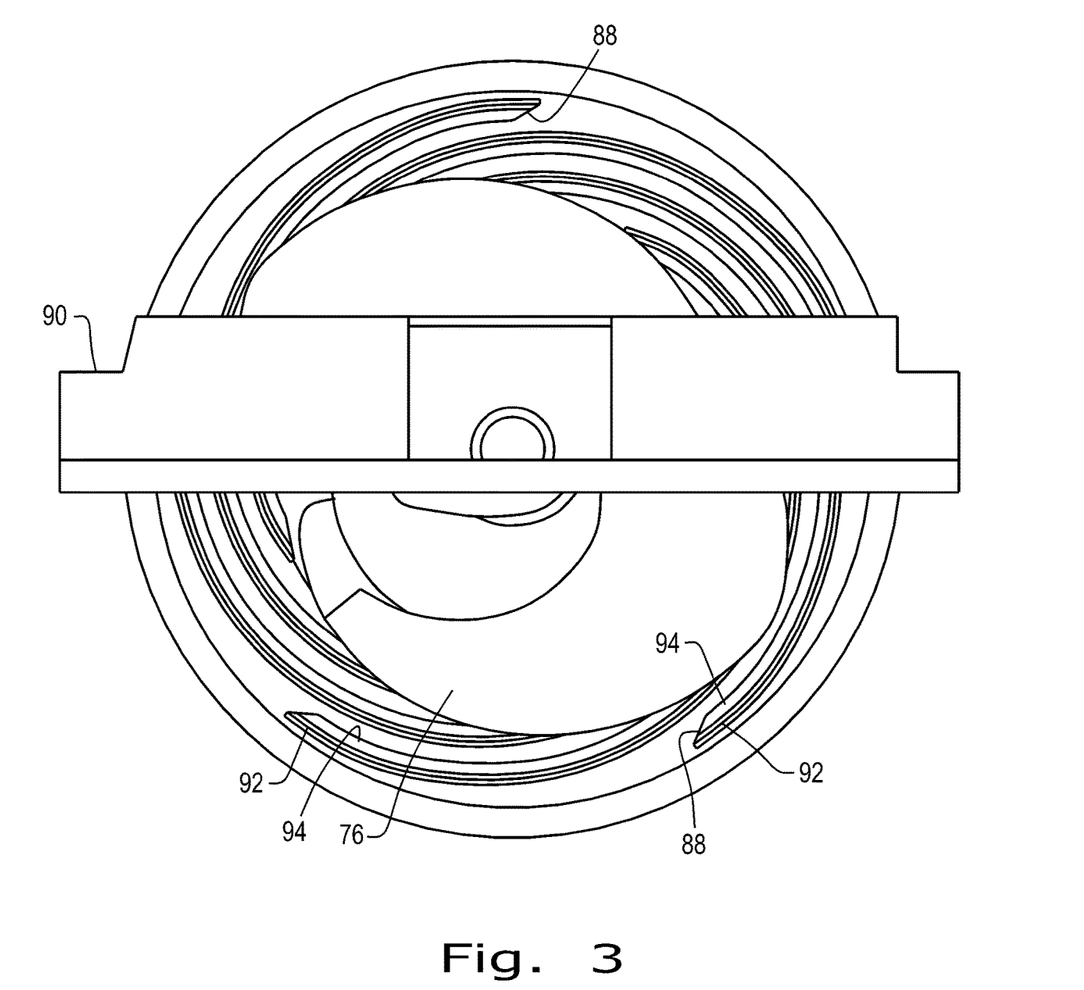
FIG. 3 is an end view of the transition cone and rotor.
Figure 4:
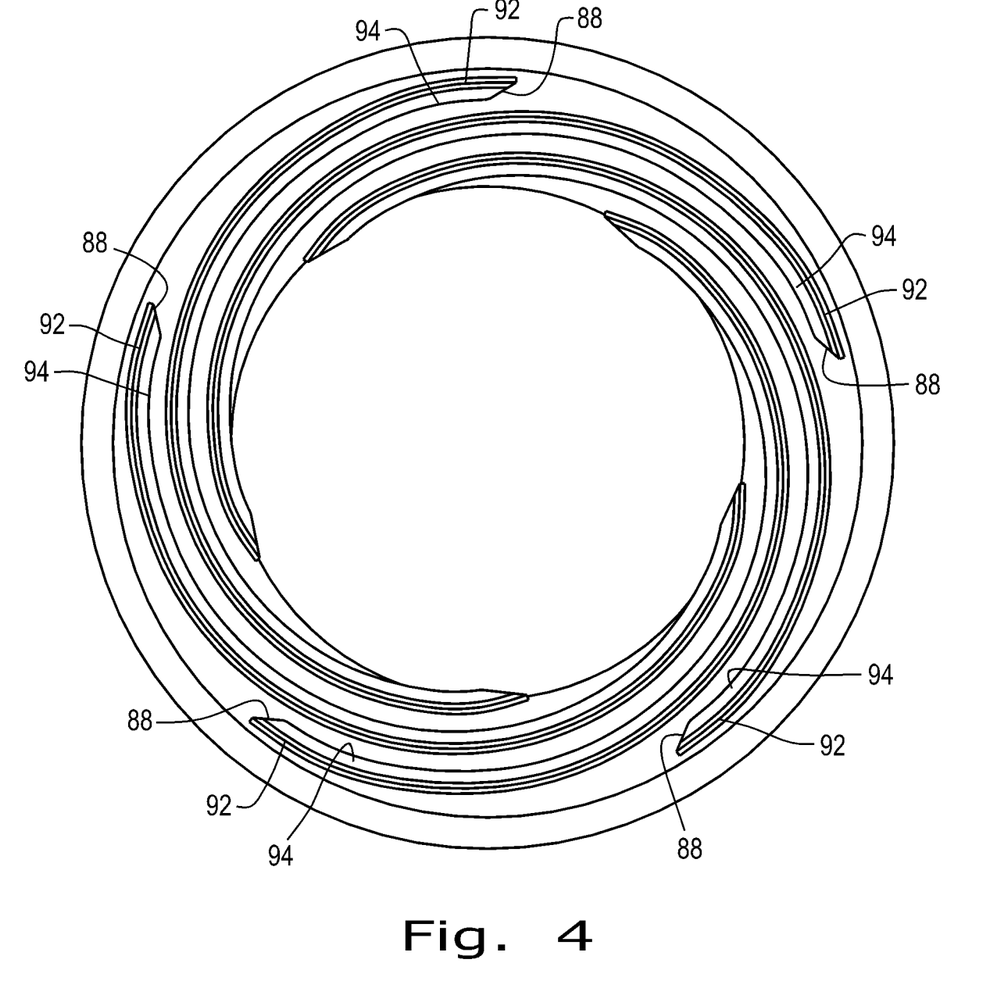
FIG. 4 is an end view of the transition cone without the rotor therein.

Referring now more specifically to FIGS. 3-4, at upstream end 84, rotor 40 is carried by a frame member 90. Transition cone 80 includes five vanes 88, each vane 88 extending from near upstream end 84 of transition cone 80 to near downstream end 86, while spiraling along approximately one half the circumference of the inner surface. The five vanes 88 are spaced evenly about the inner surface of transition cone 80. It should be understood that the use of five vanes 88 is merely exemplary, and in specific embodiments or applications, more or fewer vanes also might be used.

Figure 5:
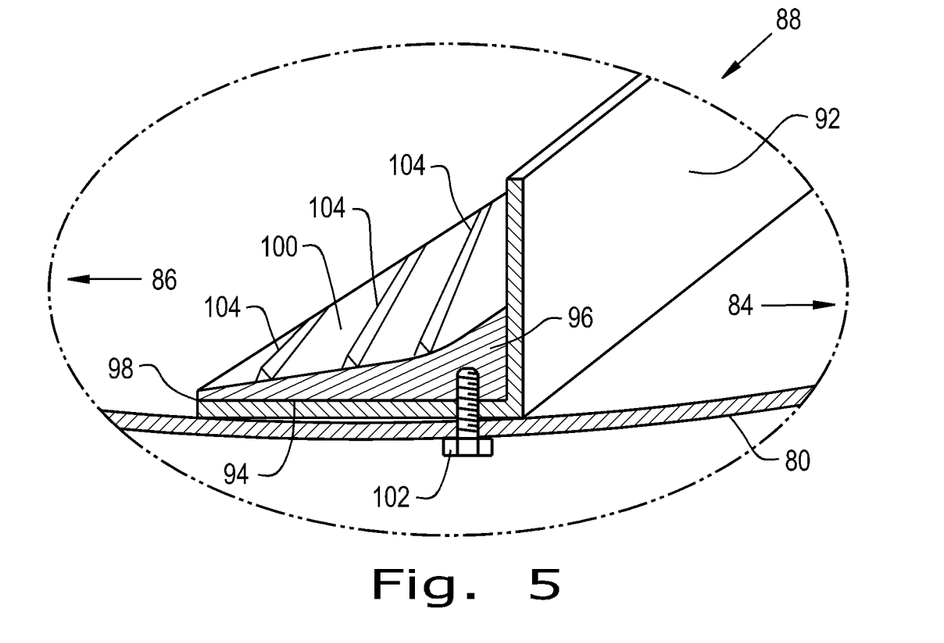
FIG. 5 is a cross-sectional view of a portion of the transition cone and vane.

With reference now particularly to FIG. 5, a cross-section of one vane 88 installed in transition cone 80 is shown, which is exemplary of all vanes 88. Vane 88 has an upstanding segment 92 that extends generally away from the inner surface 82 of transition cone 80, and a base segment 94 that extends along a portion of the inner surface 82 of transition cone 80. Each upstanding segment 92 therefore has an upstream side facing upstream end 84 and a downstream side facing downstream end 86. Base segment 94 extends away from upstanding segment 92 in the downstream direction of transition cone 80. That is, base segment 94 is on the downstream side of upstanding segment 92. Further, base segment 94 is thicker along a proximal region 96 adjacent upstanding segment 92 and thinner along a distal edge 98 of base segment 94 generally opposite to proximal region 96. An exposed surface 100 of base segment 94 curves smoothly between thicker proximal region 96 and thinner distal edge 98, from upstanding segment 92 to distal edge 98.

Each vane 88 is secured in transition cone 80 by a plurality of bolts 102 that can be inserted from the outside of transition cone 80 and anchored in base segment 94 by way of threaded holes in base segment 94 or by captured nuts or other fastener elements embedded in or affixed to base segment 94. Inserting bolts 102 from the outside of transition cone 80 simplifies and facilitates removal of a worn or damaged vane 88 and the installation of a replacement vane 88, compared to known prior configurations in which a T-bolt is inserted from the inside of transition cone 80 and secured by a nut on the outside of the transition cone, a procedure generally requiring more time and effort.

The transition cone vane disclosed herein is capable of variations. The entire vane can be a monolithic body of cast or extruded material, as well as shaped or machined material. Alternatively, the vane can include a body of generally L-shape in cross-section, with base segment 94 including an added layer of the same or different material such as by an overmolding process to establishing the varying thickness from proximal region 96 to distal edge 98 and the curved exposed surface 100. Base segment 94 can be of different dimensions extending away from upstanding segment 92. Accordingly, base segment 94 can cover and protect the primary wear area immediately downstream from the upstanding segment 92. Further, base segment 94 can be provided with surface treatments or configurations to promote transport of material through transition cone 80, and/or to provide initial preparation of the material for more effective threshing. For example, surface ridges 104 are shown on exposed surface 100 of base segment 94. Surface ridges 104 further direct the crop material and initiate a gentle threshing action.

Figure 6:
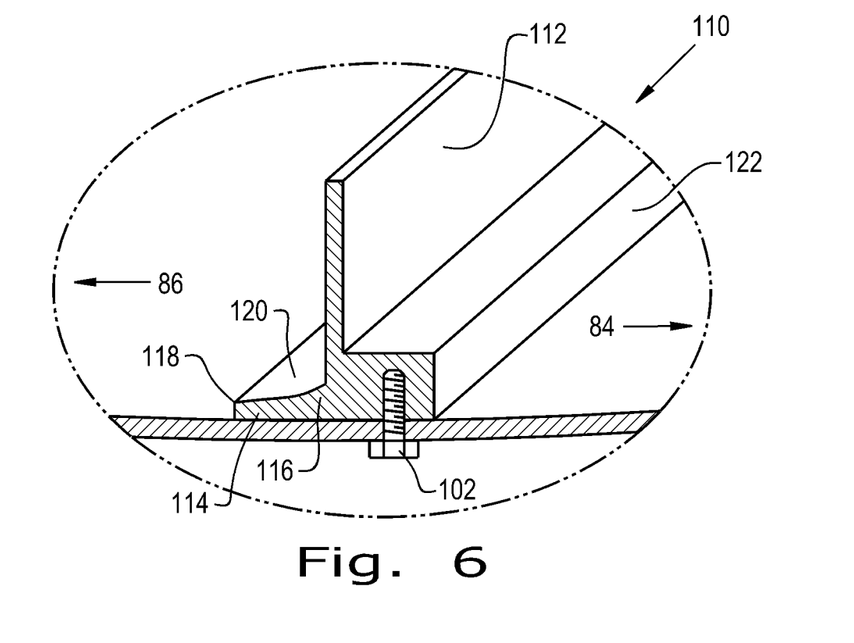
FIG. 6 is a cross-sectional view similar to that of FIG. 5, but illustrating another embodiment of the vane.

FIG. 6 illustrates a further modified vane 110 having an upstanding segment 112 and a base segment 114. Vane 110 is a monolithic body in which a proximal region 116 of base segment 114 adjacent upstanding segment 112 is thicker than a distal edge 118 of base segment 114. However, base segment 114 is somewhat narrower then base segment 94, as measured between the respective upstanding segments 92, 112 and distal edges 98, 118 thereof. Base segment 114 defines a curved exposed surface 120 between upstanding segment 112 and distal edge 118. Vane 110 further includes an anchor block 122 along the upstream side of upstanding segment 112 for receiving and engaging bolts 102 in a manner similar to that described for vane 88.

Figure 7:
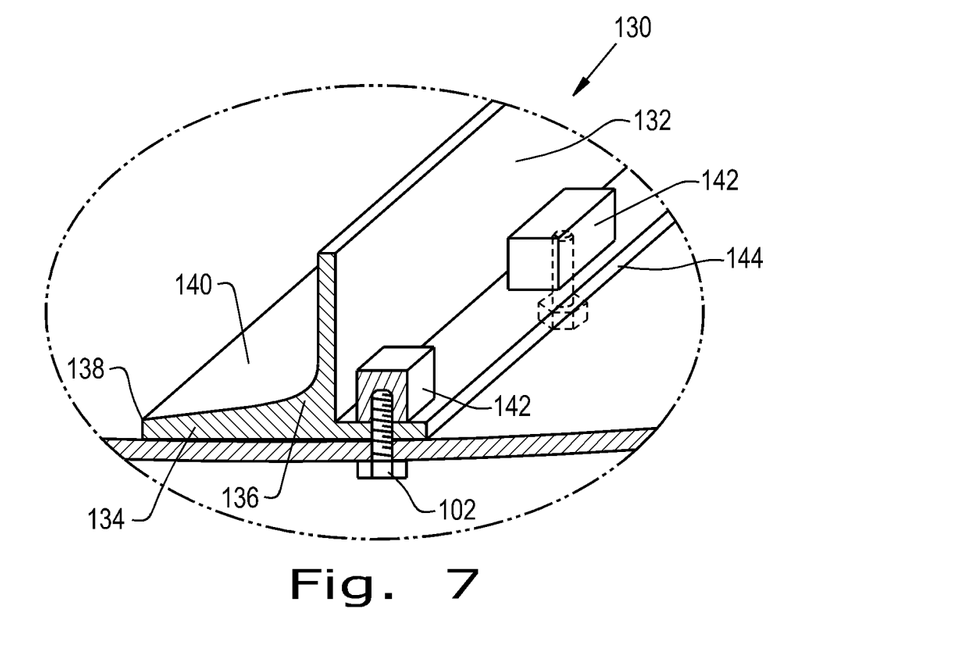
FIG. 7 is a cross-sectional view similar to that of FIGS. 5 & 6, but illustrating a further embodiment of the vane.

FIG. 7 illustrates yet another variation. Vane 130 shown therein includes an upstanding segment 132 and a base segment 134. Vane 130 is a monolithic body, with base segment 134 shaped similarly to base segment 94 described previously herein. Accordingly, vane 130 is thicker at a proximal region 136 thereof then along a distal edge 138 thereof and base segment 134 defines a curved exposed surface 140. Vane 130 differs from vane 110 in that a plurality of discrete anchor blocks 142 is provided on the upstream side of upstanding segment 132, a different anchor block 142 provided for each bolt 102 that is used to hold vane 130 in a transition cone. For example, each anchor block 142 can include a threaded hole in a block of material, or can be a common nut welded to a plate 144. Plate 144 can extend the full length of upstanding segment 132 or can be at and under only the extent of each anchor block 142.

Figure 8:
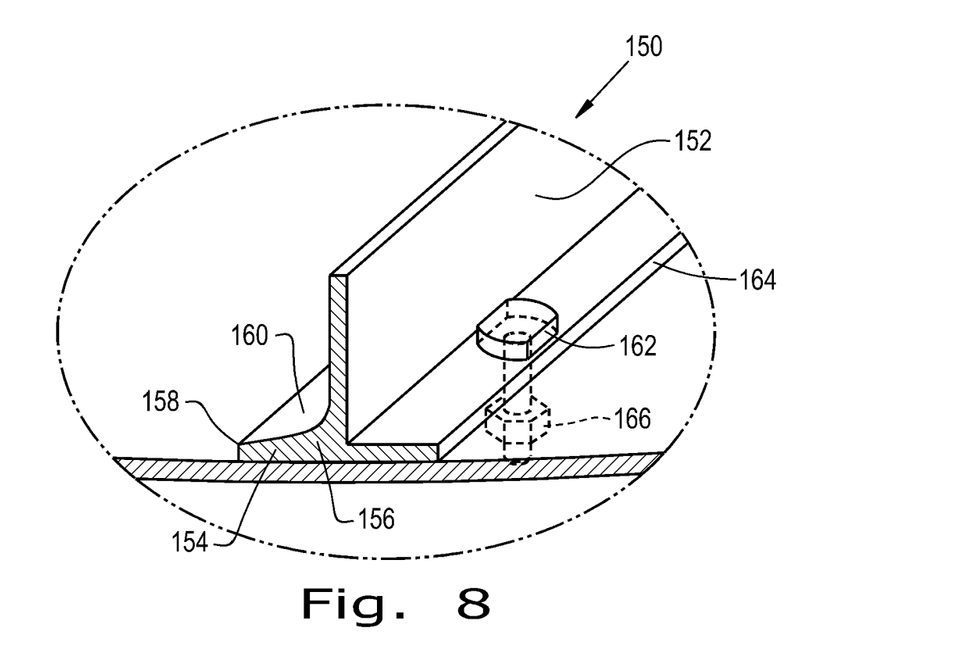
FIG. 8 is a cross-sectional view similar to those of FIGS. 5-7, but illustrating yet another embodiment of the vane.

FIG. 8 illustrates still another variation. Vane 150 shown therein includes an upstanding segment 152 and a base segment 154. Vane 150 is thicker at a proximal region 156 thereof then along a distal edge 158 thereof and base segment 154 defines a curved exposed surface 160. Vane 150 is secured by a plurality of "T"-bolts 162 extending through a plate 164 and engaging nuts 166 on the outside of transition cone 80.

The vanes disclosed herein provide replaceable wear surfaces in the primary wear area of transition cones in combine harvesters, the area immediately downstream of the upstanding vane segment. The vanes disclosed herein can be provided in different sizes to achieve maximum wear protection. This will allow the transition cone to be made of less expensive materials and can eliminate expensive surface treatments, such as chroming. By facilitating the process for removing, replacing and installing vanes, downtime is reduced and the number of parts required for servicing is minimized. The extended base segment can be provided with surface treatments or features to further promote movement of the crop material through the transition cone, and/or to begin gentle threshing of the crop material even in the transition cone, thereby enhancing grain separation.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester comprising:
    a chassis;
    a threshing system carried by said chassis, said threshing system including:
        a rotor;
        a rotor cage including a concave;
        a transition cone defining an infeed to said rotor cage and rotor, said transition cone having an inner surface with a tapering circumference between an upstream end and a downstream end; and
        a vane in said transition cone extending between said upstream end and said downstream end and along at least a portion of the cone inner surface circumference, said vane including:
            an upstanding segment extending away from the inner surface, with an upstream side of said upstanding segment facing said upstream end, and a downstream side of said upstanding segment facing said downstream end; and
            a base segment extending from the upstanding segment along the inner surface on the downstream side of said upstanding segment, said base segment comprising a thicker proximal region adjacent said upstanding segment and a thinner distal edge opposite thereto along a width of the vane, wherein the thicker proximal region extends across a majority of a length of the vane.

2. The agricultural harvester of claim 1, wherein said base segment includes a curved exposed surface extending between said proximal region and said distal edge.

3. The agricultural harvester of claim 2, wherein said transition cone includes a plurality of similarly constructed vanes.

4. The agricultural harvester of claim 2, wherein a fastener extends through said transition cone and is anchored in said vane.

5. An agricultural harvester comprising:
    a chassis;
    a threshing system carried by said chassis, said threshing system including:
        a rotor;
        a rotor cage including a concave;
        a transition cone defining an infeed to said rotor cage and rotor, said transition cone having an inner surface with a tapering circumference between an upstream end and a downstream end; and
        a vane in said transition cone extending between said upstream end and said downstream end and along at least a portion of the cone inner surface circumference, said vane including:

an upstanding segment extending away from the inner surface, with an upstream side of said upstanding segment facing said upstream end, and a downstream side of said upstanding segment facing said downstream end; and a base segment extending from the upstanding segment along the inner surface on the downstream side of said upstanding segment, said base segment comprising a thicker proximal region adjacent said upstanding segment and a thinner distal edge opposite thereto;

wherein said vane includes an anchor block extending along said inner surface of said transition cone on the upstream side of said vane, and a fastener extends through said transition cone and is anchored in said anchor block.

6. The agricultural harvester of claim 2, wherein said exposed surface includes surface configurations configured to at least one of promote transport of material through said transition cone and provide initial preparation of the material.

7. The agricultural harvester of claim 1, wherein a fastener extends through said transition cone and is anchored in said vane.

8. The agricultural harvester of claim 1, wherein said transition cone includes a plurality of said vanes.

9. A threshing system of an agricultural harvester, said threshing system including:
   a rotor cage including a concave;
   a transition cone defining an infeed to said rotor cage, said transition cone having an inner surface with a tapering inner circumference between a wider upstream end and a narrower downstream end; and
   a vane in said transition cone extending between said upstream end and said downstream end and at least partly around the tapering inner circumference, said vane including an upstanding segment extending away from the inner surface, with an upstream side of said upstanding segment facing said upstream end, and a downstream side of said upstanding segment facing said downstream end, and a base segment extending from the upstanding segment along the inner surface on the downstream side of said upstanding segment, said base segment comprising a thicker proximal region adjacent said upstanding segment and a thinner distal edge opposite thereto along a width of the vane, wherein the thicker proximal region extends continuously across a majority of a length of the vane.

10. The threshing system of claim 9, wherein said base segment includes a curved exposed surface extending between said proximal region and said distal edge.

11. The threshing system of claim 10, wherein a fastener extends through said transition cone and is anchored in said vane.

12. The threshing system of claim 10, wherein said exposed surface includes surface configurations configured to at least one of promote transport of material through said transition cone and provide initial preparation of the material.

13. The threshing system of claim 9, wherein said vane includes an anchor block extending along said inner surface of said transition cone on the upstream side of said vane, and a fastener extends through said transition cone and is anchored in said anchor block.

14. The threshing system of claim 9, wherein the thicker proximal region extends continuously along the entire length of the vane.

15. The agricultural harvester of claim 1, wherein the thicker proximal region extends continuously along the entire length of the vane.

* * * * *